(12) United States Patent
Olivier et al.

(10) Patent No.: US 12,354,129 B2
(45) Date of Patent: Jul. 8, 2025

(54) DEFAULT ALLOCATION OF CREDITS TO AN ORDER BASED ON PREDICTED CREDIT EXPIRATIONS

(71) Applicant: Maplebear Inc., San Francisco, CA (US)

(72) Inventors: Joseph Olivier, San Bruno, CA (US); Amritansh Tripathi, Fremont, CA (US); Eric Cumalander, Denver, CO (US); Kaipeng Wu, San Jose, CA (US); Lukasz Czekaj, North Las Vegas, NV (US); Joshua Beckwith, Lowell, IN (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/523,121

(22) Filed: Nov. 29, 2023

(65) Prior Publication Data
US 2025/0173754 A1     May 29, 2025

(51) Int. Cl.
*G06Q 30/0235* (2023.01)
*G06N 20/20* (2019.01)
*G06Q 30/0226* (2023.01)
*G06Q 30/0601* (2023.01)

(52) U.S. Cl.
CPC ......... *G06Q 30/0235* (2013.01); *G06N 20/20* (2019.01); *G06Q 30/0233* (2013.01); *G06Q 30/0631* (2013.01); *G06Q 30/0633* (2013.01)

(58) Field of Classification Search
None
See application file for complete search history.

(56) References Cited

U.S. PATENT DOCUMENTS

| | | | |
|---|---|---|---|
| 11,776,000 B1 * | 10/2023 | McCloskey | G06Q 30/0235 705/14.17 |
| 2017/0061461 A1 * | 3/2017 | Jajara | G06Q 20/367 |
| 2018/0204237 A1 * | 7/2018 | Jafri | G06Q 30/0233 |
| 2018/0341971 A1 * | 11/2018 | Shah | G06Q 30/0229 |
| 2021/0103921 A1 * | 4/2021 | Gadwale | G06Q 20/06 |
| 2022/0020049 A1 * | 1/2022 | Rao | G06N 20/00 |
| 2022/0383354 A1 * | 12/2022 | Vlas | G06Q 30/0283 |
| 2022/0405721 A1 * | 12/2022 | Gupta | G06Q 20/227 |
| 2023/0206316 A1 * | 6/2023 | Flowers | G06Q 30/0226 705/7.34 |
| 2024/0078524 A1 * | 3/2024 | Lidman | G06Q 20/4016 |

* cited by examiner

*Primary Examiner* — Vincent M Cao
(74) *Attorney, Agent, or Firm* — Fenwick & West LLP

(57) ABSTRACT

An online system displays an ordering interface and, responsive to receiving a request from a client device associated with a user to place an order, retrieves information describing a set of unused credits provided to the user by each of one or more programs. The system identifies a set of the program(s), wherein the set of unused credits provided by each identified program is eligible to be used for acquiring an item in the order. The system accesses and applies a machine-learning model to predict an expiration of the set of unused credits provided to the user by each identified program based on the retrieved information and a current time. The system ranks the set of programs based on the prediction(s), determines a default allocation of a subset of each set of unused credits to the order based on the ranking, and updates the interface to include the default allocation.

20 Claims, 6 Drawing Sheets

| Your Order 405 | | | Program 1 Credits 415A | Program 2 Credits 415B | Credit Card 420 |
|---|---|---|---|---|---|
| | | | $100.00 (Expires Tomorrow) | $10.00 (Expires Tomorrow) | |
| Item 1<br>✎ Add Instructions  🗑 Remove | 1 | $8.00<br>Program 1 & Program 2 Eligible | $8.00 | | |
| Item 2<br>✎ Add Instructions  🗑 Remove | 1 | $14.00<br>Program 2 Eligible | | $10.00 | $4.00 |
| Item 3<br>✎ Add Instructions  🗑 Remove | 1 | $3.00 | | | $3.00 |
| Item 4<br>✎ Add Instructions  🗑 Remove | 1 | $4.00<br>Program 1 & Program 2 Eligible | $4.00 | | |
| Total | | $29.00 | $12.00<br>✎ Edit | $10.00<br>✎ Edit | $7.00<br>✎ Edit |

DEFAULT ALLOCATION OF CREDITS TO AN ORDER BASED ON PREDICTED CREDIT EXPIRATIONS

BACKGROUND

Online systems, such as online concierge systems, may allow users to place orders with the online systems using credits. These credits may be provided to the users by various programs, such as directed spend programs that allow the credits to be used to acquire specific items. For example, directed spend programs may include food assistance programs funded by entities, such as nonprofits, employers, state or federal governments, etc., which provide credits that may be used to acquire specific items included among inventories of grocery store retailers associated with an online system. Once issued, credits may expire after a certain amount of time (e.g., at the end of each month or one month from the date they are issued). To prevent credits from expiring without being used, users may prioritize using these types of credits before using credit cards, gift cards, etc. when placing their orders. For example, a user placing an order with an online system may use credits provided by various assistance programs on at least a portion of the order based on when the credits expire, such that credits that expire the soonest are used first. In this example, the user may then use a credit card for any remaining balance on the order.

However, users may have difficulty managing credits and allocating them to their orders in an efficient way. For example, when placing an order, a user who receives credits from multiple programs may have difficulty keeping track of the credits and their expirations and may forget to use some or all of them before they expire. Additionally, in the above example, if unused credits provided to the user by more than one program may be used to acquire an item in an order, the user may have difficulty determining which credits to use first, whether to use credits received from more than one program and if so, the number of credits received from each program that should be used. In this example, to make the determination, the user may have to take into account several factors, such as other items included in the order that may be acquired using the credits, expirations of the credits, the likelihood that the user will order items that may be acquired using the credits in the near future, etc. Furthermore, in the above example, once the user makes the determination, the user may be required to perform several interactions with an online system to specify the number of credits provided by each program to be allocated to the order (e.g., by selecting a program from an interface, entering a number of credits provided by the program to be allocated to the order, etc.). In this example, performing these interactions may be especially time-consuming if the user must do the same for a credit card, a gift card, etc. that are also used to acquire other items in the order.

SUMMARY

In accordance with one or more aspects of the disclosure, to help users manage and allocate credits to orders and significantly reduce the number of interactions required to allocate credits to orders, an online system determines a default allocation of credits to an order based on predicted expirations of the credits and updates a user interface to include the default allocation. More specifically, an online system displays a user interface for placing orders with the online system. Responsive to receiving a request from a client device associated with a user of the online system to place an order including one or more items via the user interface, the online system retrieves information describing a set of unused credits provided to the user by each of one or more programs associated with the user, in which the set of unused credits expires after a threshold amount of time. The online system identifies a set of programs included among the program(s), in which the set of unused credits provided to the user by each identified program is eligible to be used for acquiring at least one item included in the order. The online system accesses a machine-learning model trained to predict an expiration of a set of unused credits provided to the user by a program and applies the model to predict the expiration of the set of unused credits provided to the user by each identified program based on the information describing the set of unused credits provided by a corresponding program and a current time. The online system then ranks the set of programs based on the predicted expiration of the set of unused credits provided to the user by each program, determines a default allocation of a subset of each set of unused credits to the order based on the ranking, and updates the user interface to include the default allocation of the subset of each set of unused credits to the order. In this way, one or more embodiments provide an improved user interface that enables a user to select an optimal allocation of sources of unused credits to complete an order, which minimizes the user's interactions (e.g., clicks) with the user interface to achieve the user's desired selection.

In one or more embodiments, the online system also identifies a set of recommended items for the user, in which each recommended item is associated with an incentive, such as a coupon or a discount. The online system identifies the set of recommended items for the user based on a set of user data for the user and the predicted expiration of the set of unused credits provided to the user by each identified program. In one or more embodiments, the online system identifies the set of recommended items using an ensemble machine-learning model by accessing and applying the model to identify the set of recommended items for the user based on the set of user data for the user and the predicted expiration of the set of unused credits provided to the user by each identified program. The online system then sends, to the client device, information describing the set of recommended items for the user.

BRIEF DESCRIPTION OF THE DRAWINGS

FIGS. 4A and 4B illustrate examples of a user interface including a default allocation of credits to an order placed with an online system based on predicted expirations of the credits, in accordance with one or more embodiments.

DETAILED DESCRIPTION

Figure 1:
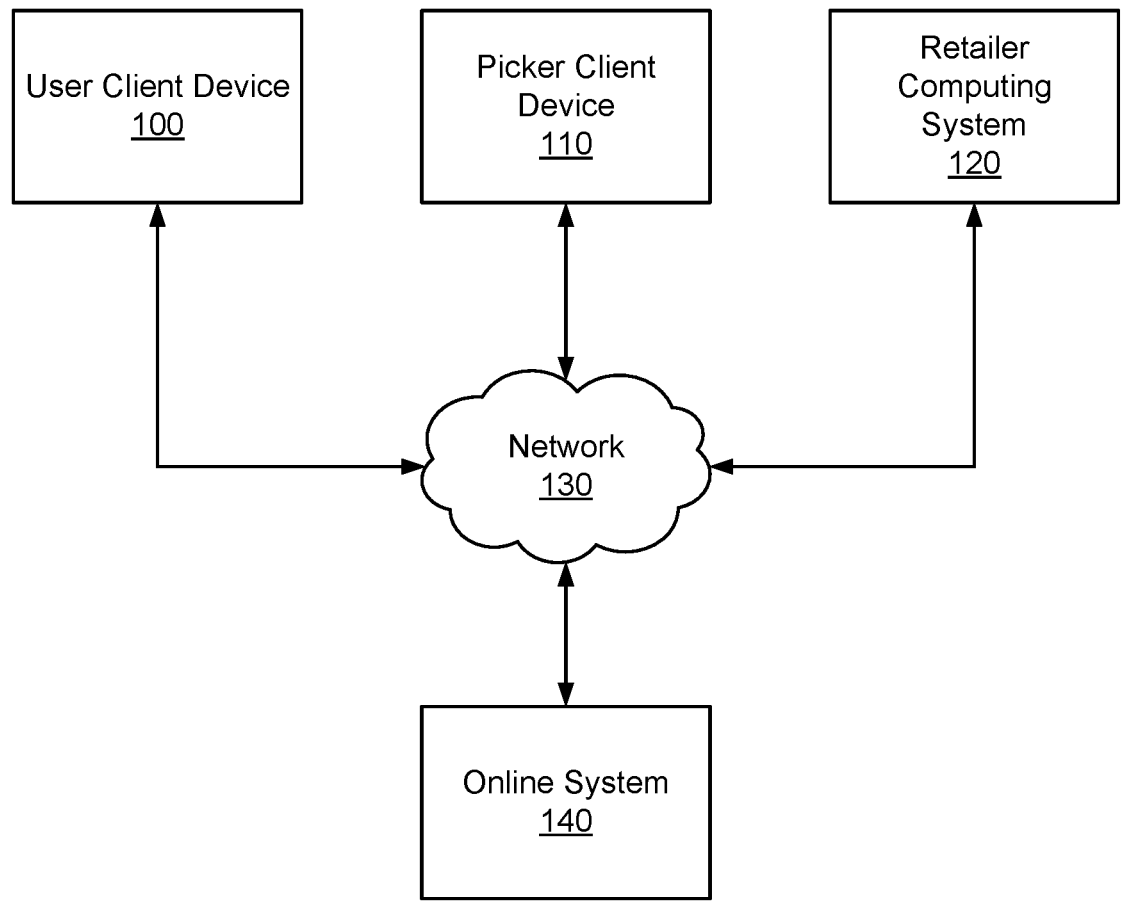
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a user client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online system 140. As such, there may be more than one user client device 100, picker client device 110, or retailer computing system 120.

The user client device 100 is a client device through which a user may interact with the picker client device 110, the retailer computing system 120, or the online system 140. The user client device 100 can be a personal or mobile computing device, such as a smartphone, a tablet, a laptop computer, or a desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, refers to a good or product that may be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the items should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location. The picker client device 110 presents the items that are included in the user's order to the picker in a collection interface. The collection interface is a user interface that provides information to the picker identifying items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 provides instructions to a picker for delivering the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 provides item data indicating which items are available at a particular retailer location and the quantities of those items. Additionally, the retailer computing system 120 may transmit updated item data to the online system 140 when an item is no longer available at the retailer location. Furthermore, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a user's order (e.g., as a commission).

The user client device 100, the picker client device 110, the retailer computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which users can order items to be provided to them by a picker from a retailer. The online system 140 receives orders from a user client device 100 through the network 130. The online system 140 selects a picker to service the user's order and transmits the order to a picker client device 110 associated with the picker. The picker collects the ordered items from a retailer location and delivers the ordered items to the user. The online system 140 may charge a user for the order and provide portions of the payment from the user to the picker and the retailer. As an example, the online system 140 may allow a user to order groceries from a grocery store retailer. The user's order may specify which groceries they want delivered from the grocery store and the quantities of each of the groceries. The user's client device 100 transmits the user's order to the online system 140 and the online system 140 selects a picker to travel to the grocery store retailer location to collect the groceries ordered by the user. Once the picker has collected the groceries ordered by the user, the picker delivers the groceries to a location transmitted to the picker client device 110 by the online system 140. The online system 140 is described in further detail below with regards to FIG. 2.

Figure 2:
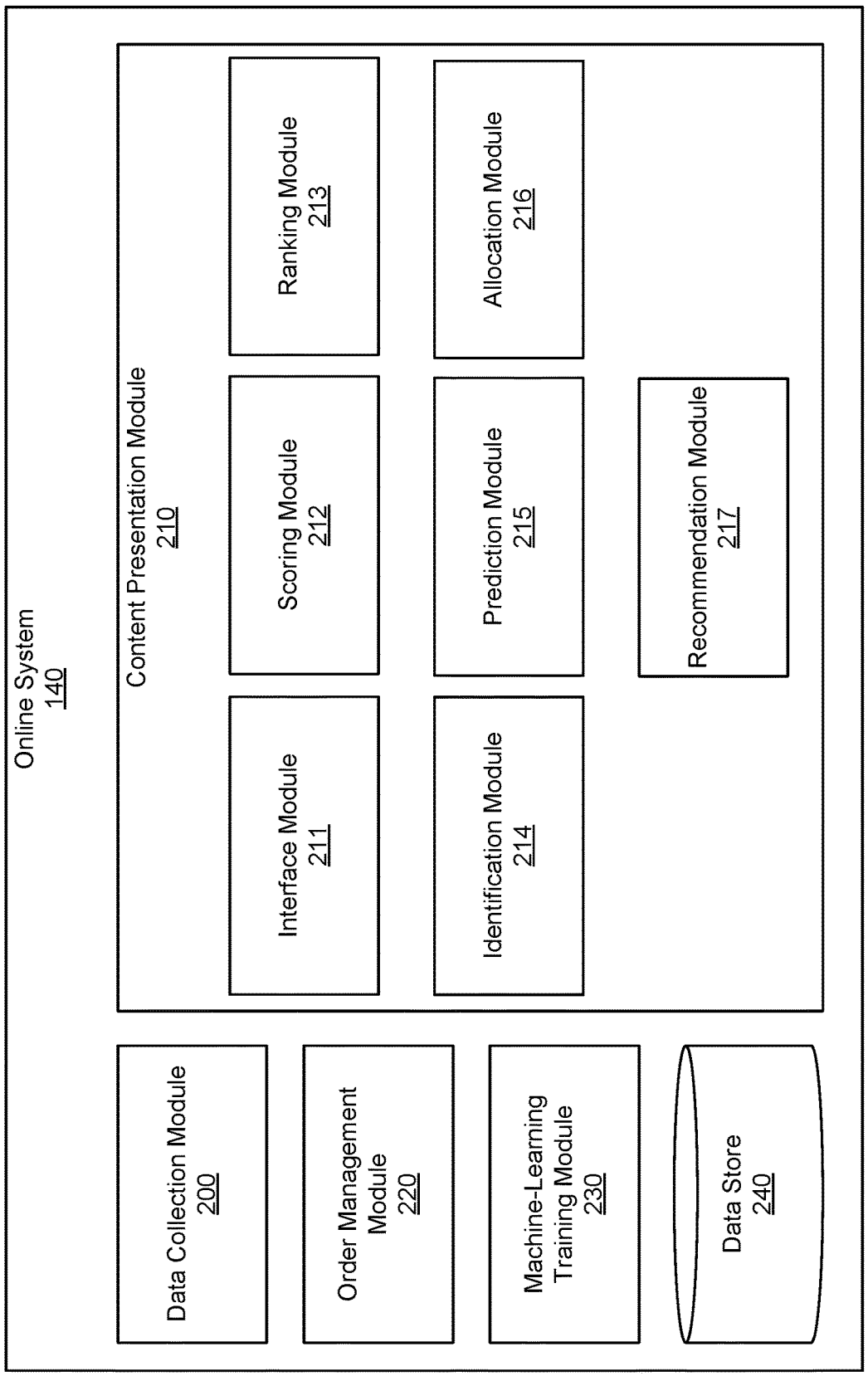
FIG. 2 illustrates an example system architecture for an online system, in accordance with one or more embodiments.

FIG. 2 illustrates an example system architecture for an online system 140, such as an online concierge system, in accordance with some embodiments. The system architecture illustrated in FIG. 2 includes a data collection module 200, a content presentation module 210, an order management module 220, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects user data, which is information or data describing characteristics of a user. User data may include a user's name, address, preferences (e.g., shopping preferences, dietary restrictions, favorite items, etc.), or stored payment instruments (e.g., credit cards, gift cards, credits provided by the online system 140 or a retailer associated with the online system 140, etc.). User data also may include demographic information associated with a user (e.g., age, gender, geographical region, etc.) or household information associated with the user (e.g., a number of people in the user's household, whether the user's household includes children or pets, the user's household income, etc.). The user data also may include default settings established by the user, such as a default retailer/retailer location, payment instrument, delivery location, or delivery timeframe.

The user data also may include information describing one or more programs associated with a user. The program(s) may include one or more directed spend programs funded by entities (e.g., nonprofits, employers, state or federal governments, etc.) or any other suitable types of programs that provide credits that may be used to acquire specific items included among inventories of retailers associated with the online system 140. For example, the user data may include information describing each program associated with a user, such as a name of the program and a type of the program (e.g., whether it is a government program, a private program, a program provided by the online system 140, a food assistance program, etc.). A set of credits may expire after a threshold amount of time, regardless of whether some or all of the credits included in the set of credits have not been used. For example, a set of credits may expire at the end of the month or one month from the date the set of credits is issued. Once a set of credits provided to a user expires, a new set of credits may be provided to the user (e.g., every 30 days, at the beginning of each month, etc.) if the user is still eligible for a program that provided the set of credits (e.g., based on a set of rules or policies that describe eligibility requirements, a number of credits a user is eligible to receive from the program based on household size or income, etc.). In the above example, once the set of credits expires, if the user is eligible to continue receiving credits under the program, the program may provide an additional set of credits to the user that expires at the end of the following month or one month from the date the additional set of credits is issued.

The user data also may include information describing a set of unused credits provided to a user by each of one or more programs associated with the user. Examples of such types of information include: information identifying a program that provided the set of unused credits, a number of unused credits included in the set, information describing items that may be acquired using the set of unused credits, an expiration of the set of unused credits, or any other suitable types of information. For example, the user data may include information describing a number of unused credits provided to a user by a food assistance program associated with the user, item identifiers, brands, item categories or other attributes of items that may be acquired using the unused credits, and an expiration date or an issue date and a number of days from issuance that the unused credits will expire.

The user data also may include information describing actions performed by a user. The user data may describe actions performed by a user during a current session of the user with the online system 140. For example, the user data may describe queries received from a user client device 100 associated with the user, items added to a list (e.g., a shopping list, a wish list, a list of saved items, etc.) associated with the user, items the user browsed, items for which the user searched, items included in an order the user has requested to place with the online system 140, etc. during a current session of the user with the online system 140. The user data also may describe actions previously performed by a user, such that the user data may include historical information (e.g., historical order, purchase, or interaction information) associated with the user. For example, the user data may describe previous orders placed by a user with the online system 140 or previous purchases made by the user at retailer locations, such as items included in the previous orders/purchases, a number of credits received from each program associated with the user used to acquire items included in the previous orders/purchases, if any, etc. As an additional example, the user data may describe previous interactions by a user with items or other content (e.g., coupons, recipes, or advertisements) presented by the online system 140. In the above example, the user data may describe the items/content (e.g., attributes of items, discounts or coupons associated with items with which the user interacted, etc.), the types of interactions (e.g., adding items to a shopping list, searching for items, browsing items, clicking on an advertisement, placing an order, etc.), and the times of the interactions (e.g., a timestamp associated with each interaction).

The user data also may include information that is derived from other user data. For example, based on historical order or purchase information associated with a user, the user data may include a frequency with which a user orders or purchases items of a particular brand, a percentage of items the user orders/purchases that are on sale, and types of items that the user orders/purchases from a particular retailer. In the above example, based on the historical order or purchase information associated with the user, the user data also may include a frequency with which the user places orders/makes purchases using credits received from each program associated with the user, an average number of credits received from each program used for each order/purchase, etc. Additionally, in the above example, based on the historical order or purchase information associated with the user, the user data also may include a frequency with which the user places orders/makes purchases using a credit card, a gift card, or other payment instrument, an average dollar amount charged to the credit card, the gift card, or other payment instrument for each order/purchase, etc. The data collection module 200 may collect the user data from sensors on the user client device 100 or based on the user's interactions with the online system 140. The data collection module 200 also may collect the user data from one or more third-party systems (e.g., one or more third-party systems associated with one or more programs described above) or from any other suitable source.

The data collection module 200 also collects item data, which is information or data identifying and describing items that are available at a retailer location. The item data may include item identifiers for items that are available and may include quantities of items associated with each item identifier. Additionally, item data may also include attributes of items such as the sizes, colors, weights, stock keeping units (SKUs), or serial numbers for the items. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or a user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data describing characteristics of pickers. For example, the picker data for a picker may include the picker's name, the picker's location, how often the picker has serviced orders for the online system 140, a user rating for the picker, the retailers from which the picker has collected items, or the picker's previous shopping history. Additionally, the picker data may include preferences expressed by the picker, such as their preferred retailers for collecting items, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data describing characteristics of an order. For example, order data may include item data for items that are included in the order, a delivery location for the order, a user associated with the order, a retailer location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

The content presentation module 210 selects content for presentation to a user. For example, the content presentation module 210 selects which items to present to a user while the user is placing an order. Components of the content presentation module 210 include: an interface module 211, a scoring module 212, a ranking module 213, an identification module 214, a prediction module 215, an allocation module 216, and a recommendation module 217, which are further described below.

The interface module 211 generates and transmits an ordering interface for the user to order items. The interface module 211 populates the ordering interface with items that the user may select for adding to their order. In some embodiments, the interface module 211 presents a catalog of all items that are available to the user, which the user can browse to select items to order. Other components of the content presentation module 210 may identify items that the user is most likely to order and the interface module 211 may then present those items to the user. For example, the scoring module 212 may score items and the ranking module 213 may rank the items based on their scores. In this example, the identification module 214 may identify items with scores that exceed some threshold (e.g., the top n items or the p percentile of items) and the interface module 211 then displays the selected items. The interface module 211 also may update the ordering interface to include information describing a default allocation of a subset of each of one or more sets of unused credits to an order, as described below. Additionally, the interface module 211 may generate and transmit an interface including a set of recommended items for a user, as also described below.

The scoring module 212 may use an item selection model to score items for presentation to a user. An item selection model is a machine-learning model that is trained to score items for a user based on item data for the items and user data for the user. For example, the item selection model may be trained to determine a likelihood that the user will order an item. In some embodiments, the item selection model uses item embeddings describing items and user embeddings describing users to score items. These item embeddings and user embeddings may be generated by separate machine-learning models and may be stored in the data store 240.

In some embodiments, the scoring module 212 scores items based on a search query received from the user client device 100. A search query is free text for a word or set of words that indicate items of interest to the user. The scoring module 212 scores items based on a relatedness of the items to the search query. For example, the scoring module 212 may apply natural language processing (NLP) techniques to the text in the search query to generate a search query representation (e.g., an embedding) that represents characteristics of the search query. The scoring module 212 may use the search query representation to score candidate items for presentation to a user (e.g., by comparing a search query embedding to an item embedding).

In some embodiments, the scoring module 212 scores items based on a predicted availability of an item. The scoring module 212 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The scoring module 212 may apply a weight to the score for an item based on the predicted availability of the item. Alternatively, the items may be filtered out from presentation to a user based on whether the predicted availability of the item exceeds a threshold.

The identification module 214 may retrieve information from the data store 240 describing a set of unused credits provided to a user by each of one or more programs associated with the user. The identification module 214 may do so in response to receiving a request from a user client device 100 associated with the user to place an order including one or more items with the online system 140. The program(s) may include one or more directed spend programs or other types of programs that provide credits that may be used to acquire specific items included among inventories of retailers associated with the online system 140. As described above, a set of unused credits may expire after a threshold amount of time. For example, the identification module 214 may retrieve information describing one or more programs associated with a user and a set of unused credits provided to the user by each program. In this example, the retrieved information may include a name of each program and a type of each program (e.g., whether it is a government program, a private program, a program provided by the online system 140, a food assistance program, etc.). In the above example, the retrieved information also may include a number of unused credits included in each set of unused credits, information describing items (e.g., item identifiers, item categories, etc.) that may be acquired using each set of unused credits, and an expiration of each set of unused credits (e.g., an expiration date or an issue date and a number of days from issuance that the set of unused credits will expire).

The identification module 214 also may retrieve additional types of information associated with a user from the data store 240. For example, the identification module 214 may retrieve information describing queries received from a user client device 100 associated with a user and information describing items (e.g., item identifiers, brands, item categories, or other attributes of items) with which the user interacted during a current session of the user with the online system 140. In the above example, the items may include items added to a shopping list associated with the user, items the user browsed, items for which the user searched, items included in an order the user has requested to place with the online system 140, etc. As an additional example, the identification module 214 may retrieve information describing previous orders a user placed with the online system 140, such as information describing items included in each order, whether any coupons or discounts were applied to items included in each order, a date that each order was placed, a number of credits provided by each program associated with the user used to acquire items included in each order, etc. In the above example, the identification module 214 also may retrieve information describing a frequency with which the user orders an item or places orders using a credit card, a gift card, or credits received from each program associated with the user, etc. As yet another example, the identification module 214 may retrieve demographic information associated with a user (e.g., age, gender, geographical region, etc.) and household information associated with the user (e.g., a number of people in the user's household, whether the user's household includes children or pets, the user's household income, etc.). In the above example, the identification module 214 also may retrieve a set of preferences associated with the user (e.g., shopping preferences, dietary restrictions, favorite items, etc.) and stored payment instruments associated with the user (e.g., credit cards, gift cards, credits provided by the online system 140 or a retailer associated with the online system 140, etc.).

The identification module 214 also may identify a set of programs associated with a user, in which a set of unused credits provided to the user by each identified program is eligible to be used for acquiring at least one item included in an order that the user has requested to place with the online system 140. The identification module 214 may identify the set of programs based on information retrieved from the data store 240. For example, suppose that the identification module 214 has retrieved information describing items that may be acquired using a set of unused credits provided to a user by each of one or more programs associated with the user and information describing one or more items included in an order the user has requested to place with the online system 140 during a current session of the user with the online system 140. In this example, the identification module 214 may identify each set of unused credits that is eligible to be used for acquiring one or more items included in the order by comparing one or more attributes of each item included in the order to one or more attributes of each item that may be acquired using the set of unused credits. In some embodiments, a set of unused credits provided to a user by each of multiple programs associated with the user is eligible to be used to acquire the same item included in an order that the user has requested to place with the online system 140. In such embodiments, a portion of a set of credits provided to the user by each program may be used to acquire the item. For example, suppose that a user is associated with a first program and a second program and that credits provided by either or both programs may be used to acquire an item included in an order that the user has requested to place with the online system 140. In this example, if the item has a price of $10.00, $10.00 in credit provided to the user by one of the programs or a portion of the credits (e.g., $5.00) provided to the user by each program may be used to acquire the item.

The prediction module 215 predicts an expiration of a set of unused credits provided to a user by a program associated with the user. A predicted expiration of a set of unused credits may correspond to a predicted likelihood that at least some of the set of unused credits will expire or an amount (e.g., a number or a percentage) of the set of unused credits that is predicted to expire. For example, if a set of unused credits includes $100.00 in credits, the prediction module 215 may predict a likelihood that at least a portion of the $100.00 in credits will expire before being used. Alternatively, in the above example, the prediction module 215 may predict that 30% or $30.00 of the $100.00 in credits will likely expire before being used. The prediction module 215 may predict an expiration of a set of unused credits provided to a user by a program associated with the user based on a set of user data for the user (e.g., information describing the set of unused credits or a frequency with which each payment instrument associated with the user is used), temporal information (e.g., the current date or time of the month), or any other suitable types of information. For example, suppose that user data for a user indicates that the user has $100.00 in unused credits provided by a program associated with the user that expire on Oct. 4, 2023 and that temporal information indicates that a current date is Oct. 3, 2023, such that the $100.00 in unused credits will expire tomorrow. In this example, based on the user data for the user and the temporal information, the prediction module 215 may predict a 99% likelihood that at least some of the set of unused credits provided to the user by the program will expire or that $100.00 of the set of unused credits will likely expire. Alternatively, in the above example, suppose that the user data for the user also indicates that the user usually places orders that cost an average of $100.00 once a week and that credits previously provided to the user by the program were used to cover about half the cost of the user's previous orders, while a payment instrument corresponding to a credit card associated with the user was used to cover the other half. In this example, the prediction module 215 may predict a 50% likelihood that at least some of the set of unused credits will expire or that $50.00 of the set of unused credits will likely expire.

The prediction module 215 also may predict an expiration of a set of unused credits provided to a user by a program associated with the user using a credit expiration prediction model. The credit expiration prediction model is a machine-learning model trained to predict an expiration of a set of unused credits provided to a user by a program associated with the user. In some embodiments, the credit expiration prediction model is a multi-task model that predicts an expiration of a set of unused credits provided to a user by each program associated with the user. To use the credit expiration prediction model, the prediction module 215 may access the model (e.g., from the data store 240) and apply the model to a set of inputs. The set of inputs may include various types of information described above, such as a set of user data for a user, temporal information, etc. For example, the set of inputs may include information describing a set of unused credits provided to a user by a program associated with the user (e.g., a number of unused credits provided to the user by the program, an expiration of the set of unused credits, information describing items that may be acquired using the set of unused credits, etc.). In this example, the set of inputs also may include historical order or purchase information associated with the user (e.g., items ordered/purchased, frequency of orders placed with the online system 140, frequency of purchases made with retailers associated with the online system 140, total cost associated with previous orders/purchases, number of credits provided by the program used for previous orders/purchases, etc.). In the above example, the set of inputs also may include temporal information (e.g., information describing a current date, a number of days until the end of the current month, etc.).

Once the prediction module 215 applies the credit expiration prediction model to a set of inputs, the prediction module 215 may receive an output from the model corresponding to a predicted expiration of a set of unused credits provided to a user by a program associated with the user. Continuing with the above example, the output received by the prediction module 215 may correspond to a value, such as a percentage, a score, etc. that indicates or is proportional to a likelihood that some or all of the set of unused credits provided to the user by the program will expire. Alternatively, in the above example, the output may correspond to a value, such as a dollar amount, a percentage, etc. that indicates a predicted amount of the set of unused credits provided to the user by the program that will expire. In some embodiments, the credit expiration prediction model may be trained by the machine-learning training module 230, as further described below.

In some embodiments, as part of an allocation determination process, the prediction module 215 may predict multiple expirations of a set of unused credits provided to a user by a program associated with the user. The prediction module 215 may do so by making the predictions in different ways (e.g., by making different types of predictions or by making the predictions based on different inputs). For example, the prediction module 215 may predict a first expiration of a set of unused credits provided to a user by a program, in which the first expiration corresponds to a likelihood that some or all of the set of unused credits will expire. In this example, the prediction module 215 also may predict a second expiration of the set of unused credits, in which the second expiration corresponds to a predicted amount (e.g., a number or a percentage) of the set of unused credits that will expire. As an additional example, using the credit expiration prediction model, the prediction module 215 may predict multiple expirations of a set of unused credits provided to a user by a program associated with the user. In this example, the prediction module 215 may use the model to predict a first expiration of the set of unused credits based on a set of inputs including information describing the set of unused credits (e.g., a number of unused credits included among the set, information describing items that may be acquired using the set of unused credits, etc.) and temporal information (e.g., the current date or time of the month). In this example, the prediction module 215 also may use the model to predict a second expiration of the set of unused credits based on a set of inputs that includes the information included in the input used to predict the first expiration of the set of unused credits, as well as historical order information associated with the user. In the above example, the prediction module 215 also may use the model to predict a third expiration of the set of unused credits based on a set of inputs that includes the information included in the input used to predict the second expiration of the set of unused credits, as well as demographic information associated with the user.

The ranking module 213 may rank a set of programs associated with a user. The ranking module 213 may do so based on a predicted expiration of a set of unused credits provided to the user by each program. For example, suppose that a user is associated with three programs, in which a set of unused credits provided to the user by a first program is predicted to expire first, a set of unused credits provided to the user by a second program is predicted to expire next, and a set of unused credits provided to the user by a third program is predicted to expire last. In this example, the ranking module 213 may rank the programs from highest to lowest based on the predicted expiration of the corresponding sets of credits, such that the first program is ranked first, the second program is ranked second, and the third program is ranked third. Alternatively, in the above example, suppose that $100.00 of unused credits provided to the user by the first program are predicted to expire, $50.00 of unused credits provided to the user by the second program are predicted to expire, and $10.00 of unused credits provided to the user by the third program are predicted to expire. In this example, the ranking module 213 may rank the programs from highest to lowest based on the corresponding amounts of unused credits predicted to expire, such that the first program is ranked first, the second program is ranked second, and the third program is ranked third. As described above, in some embodiments, the prediction module 215 predicts multiple expirations of a set of unused credits provided to a user by each program associated with the user as part of an allocation determination process. In such embodiments, as part of the allocation determination process, the ranking module 213 ranks programs associated with the user multiple times based on the predicted expirations associated with the programs, such that each ranking of the programs is based on expirations that are predicted the same way.

In embodiments in which a user associated with a set of programs is also associated with one or more credit cards, gift cards, or any other types of payment instruments, the ranking module 213 may rank the set of programs and payment instrument(s) together in a unified ranking. The ranking module 213 may do so based on a predicted expiration of a set of unused credits provided to the user by each program, information associated with each payment instrument (e.g., an expiration associated with the payment instrument, items to which the payment instrument may be applied, etc.), a set of rules, or any other suitable types of information. For example, suppose that a user is associated with a program that provided a set of unused credits to the user, as well as payment instruments including a gift card and a credit card. In this example, based on a set of rules stored in the data store 240 describing different priorities associated with unused credits, gift cards, and credit cards, the ranking module 213 may rank the program first, the gift card second, and the credit card last.

For each set of unused credits provided to a user by a set of programs associated with the user, the allocation module 216 may determine a default allocation of a subset of a corresponding set of unused credits to an order that the user has requested to place with the online system 140. The allocation module 216 may do so based on a ranking of the set of programs. For example, suppose that two programs are associated with a user, in which a first program provided $100.00 of unused credits to the user and the second program provided $10.00 of unused credits to the user and all of the credits expire tomorrow, and that a payment instrument corresponding to a credit card is also associated with the user. In this example, suppose also that the ranking module 213 has ranked the first program, the second program, and the credit card first, second, and third, respectively. Continuing with this example, suppose also that the user is placing an order that includes four items and that unused credits provided by both programs are eligible to be used to acquire the first item, unused credits provided by the second program are eligible to be used to acquire the second item, unused credits are not eligible to be used to acquire the third item, and unused credits provided by both programs are eligible to be used to acquire the fourth item. In this example, based on the ranking, the allocation module 216 may allocate as many of the unused credits provided by the first program as possible, such that $12.00 of the unused credits are allocated to the first and fourth items, which cost $8.00 and $4.00, respectively. In this example, if the second item costs $14.00, since the $10.00 of unused credits provided by the second program will not cover the price of this item, the allocation module 216 may allocate all $10.00 of unused credits to the second item. In the above example, the allocation module 216 may allocate $7.00 to a credit card for the rest of the order ($4.00 to cover the remaining cost of the second item and $3.00 to cover the entire cost of the third item).

A default allocation of unused credits to an order determined by the allocation module 216 may be aggregated or itemized. In embodiments in which a default allocation of unused credits to an order determined by the allocation module 216 is aggregated, the default allocation describes an amount (e.g., a dollar amount) associated with each program, credit card, gift card, or other payment instrument to be applied to the order. In the above example, if the total cost of the order is $29.00, the default allocation may be aggregated to indicate that $12.00 of the unused credits provided to the user by the first program, $10.00 of the unused credits provided to the user by the second program, and $7.00 in charges on the credit card associated with the user are to be used for the order. In embodiments in which a default allocation of unused credits to an order determined by the allocation module 216 is itemized, the default allocation may describe an amount (e.g., a dollar amount) associated with each program, credit card, gift card, or other payment instrument to be applied to each item in the order. In the above example, the default allocation also may be itemized to indicate that the $12.00 of unused credits provided by the first program is being used to acquire the first and fourth items that cost $8.00 and $4.00, respectively, that the $10.00 of unused credits provided by the second program and $4.00 in credit card charges are being used to acquire the second item that costs $14.00, and that $3.00 in credit card charges is being used to acquire the third item that costs $3.00.

In embodiments in which the ranking module 213 ranks programs associated with a user multiple times as part of the allocation determination process described above, the allocation module 216 may determine multiple default allocations of unused credits to an order as part of the allocation determination process. The allocation module 216 may do so based on each ranking of the programs. The allocation determination process (which includes predicting an expiration of a set of unused credits provided to the user by each of a set of programs associated with the user, ranking the set of programs, and determining the default allocation of unused credits to the order) may be repeated until the allocation module 216 determines that a set of stopping criteria have been met. The set of stopping criteria may indicate that a default allocation of unused credits to an order is optimal (e.g., the usage of unused credits provided to the user by a set of programs associated with the user is maximized). For example, the allocation determination process may be repeated until the allocation module 216 determines that multiple default allocations of unused credits to an order have converged. The allocation determination process also may be repeated a specific number of times and the allocation module 216 may identify an optimal default allocation of unused credits to an order. For example, the allocation determination process may be repeated n number of times to generate multiple default allocations of unused credits to an order. In this example, the allocation module 216 may then identify, from the multiple default allocations, a default allocation that minimizes a predicted number of unused credits provided to a user that will expire or a likelihood that at least some of the unused credits will expire.

Once the allocation module 216 determines, for each set of unused credits provided to a user by a set of programs associated with the user, a default allocation of a subset of a corresponding set of unused credits to an order, the interface module 211 may update the ordering interface to include information describing the default allocation. In embodiments in which an allocation determination process is executed, the interface module 211 may update the ordering interface to include information describing an optimal default allocation identified by the allocation module 216. As described above, the default allocation may be aggregated. For example, if the total cost of an order is $29.00, the default allocation may indicate that $12.00 of unused credits provided to a user by a first program, $10.00 of unused credits provided to the user by a second program, and $7.00 in charges on a credit card associated with the user are to be used for the order. As also described above, the default allocation also may be itemized. In the above example, the default allocation also may indicate that the $12.00 of unused credits provided by the first program is being used to acquire an $8.00 item and a $4.00 item, that the $10.00 of unused credits provided by the second program and $4.00 of the $7.00 in credit card charges are being used to acquire a $14.00 item, and that $3.00 of the $7.00 in credit card charges is being used to acquire a $3.00 item. A default allocation of unused credits to an order may be manually changed by a user to whom the default allocation is presented. In the above example, the user may change the default allocation by editing a dollar amount of unused credits provided by the first or second program or a dollar amount in credit card charges (e.g., for each item or in aggregate).

The recommendation module 217 may identify a set of recommended items for a user. The recommendation module 217 may do so based on user data for the user that the recommendation module 217 retrieves from the data store 240. Examples of such types of information include: demographic information associated with the user, the user's preferences, household information associated with the user, historical order, purchase, or interaction information associated with the user, information describing actions the user performed during a current session of the user with the online system 140, etc. For example, based on historical order or purchase information associated with a user, the recommendation module 217 may identify a set of recommended items for the user that include items the user ordered/purchased with at least a threshold frequency. In the above example, based on historical interaction information associated with the user, the set of recommended items also may include items associated with item categories that the user frequently browsed or items that the user frequently added to their cart that were also on sale or for which a coupon was available. Continuing with the above example, based on a set of preferences associated with the user or household information associated with the user, the set of recommended items also may include items for which the user is likely to have an affinity. In this example, if the set of preferences associated with the user indicates that the user has a preference for spicy foods, the set of recommended items may include hot sauce, spicy salsa, etc. Additionally, in the above example, if the household information associated with the user indicates that the user's household includes a baby and small children, the set of recommended items also may include baby food, diapers, school supplies, etc. Continuing with this example, suppose that items included in a shopping list associated with the user or items for which the user searched during a current session of the user with the online system 140 include spaghetti sauce. In this example, the set of recommended items also may include items for which the user is likely to have an affinity based on the spaghetti sauce, such as spaghetti, garlic bread, or other items that are often ordered with spaghetti sauce.

The recommendation module 217 also may identify a set of recommended items for a user based on additional types of information, such as a predicted expiration of a set of unused credits provided to the user by a program associated with the user, or any other suitable types of information. For example, based on user data for a user and a predicted expiration of a set of unused credits provided to the user by each of a set of programs associated with the user, the recommendation module 217 may identify a set of recommended items for the user that includes items associated with item categories for which the user is likely to have an affinity that may be acquired using the set of unused credits provided to the user by each program. In the above example, when identifying the set of recommended items, the recommendation module 217 may prioritize items based on the predicted expiration of the set of unused credits provided to the user by each program, such that the recommendation module 217 may favor identifying items that may be acquired using one or more sets of unused credits associated with at least a threshold predicted expiration. Alternatively, in the above example, the recommendation module 217 may prioritize items that may be acquired using sets of unused credits associated with higher predicted likelihoods of expiring or more unused credits predicted to expire over items that may be acquired using sets of unused credits associated with lower predicted likelihoods of expiring or fewer unused credits predicted to expire.

In some embodiments, in addition to identifying a set of recommended items for a user, the recommendation module 217 also determines an incentive (e.g., a coupon, a reward, a discount, a promotion, etc.) associated with each recommended item. An incentive associated with a recommended item may correspond to a dollar amount (e.g., $3.00) or a percentage (e.g., 25%) off a price of the recommended item, a quantity or bulk promotion (e.g., buy two, get one free) associated with the recommended item, a number of points associated with the recommended item that may be redeemed for discounts or other rewards, etc. The recommendation module 217 may determine an incentive associated with a recommended item based on historical user information associated with the user or based on any other suitable types of information. For example, suppose that the recommendation module 217 retrieves historical order or purchase information associated with a user from the data store 240, in which the historical order/purchase information describes whether each item previously ordered/purchased by the user was associated with an incentive and if so, information describing the incentive (e.g., a dollar amount or a percentage off). In this example, suppose also that a set of recommended items for the user includes a specific brand of frozen pizza that normally costs $7.00 and the historical order information indicates that the user previously ordered/purchased the item only when an incentive was available for the item that reduced the price of the item to between $3.00 and $4.00. In the above example, the recommendation module 217 may determine an incentive associated with the recommended item that reduces the price of the item by a similar amount (e.g., a 50% off coupon, a buy one, get one free promotion, etc.).

The recommendation module 217 also may identify a set of recommended items for a user using an item recommendation model. The item recommendation model may be an ensemble machine-learning model or any other suitable type of machine-learning model trained to identify a set of recommended items for a user. For example, the item recommendation model may be an ensemble machine-learning model that combines the output of the credit expiration prediction model describing a predicted expiration of a set of unused credits provided to a user by each of a set of programs associated with the user with the output of another model that is applied to a set of inputs to identify a set of recommended items for the user. In some embodiments, in addition to identifying a set of recommended items for a user, the item recommendation model also determines an incentive associated with each recommended item, such that each item identified by the item recommendation model is associated with an incentive. In some embodiments, the item recommendation model uses item embeddings describing items and user embeddings describing users to identify a set of recommended items for a user. These item embeddings and user embeddings may be generated by separate machine-learning models and may be stored in the data store 240.

To use the item recommendation model, the recommendation module 217 may access the model (e.g., from the data store 240) and apply the model to a set of inputs. The set of inputs may include various types of information described above, such as a set of user data for a user, information associated with a set of unused credits provided to the user by each program associated with the user, or any other suitable types of information. For example, the set of inputs may include historical order or purchase information associated with a user including information describing items the user previously ordered or purchased, a frequency with which the user ordered/purchased each item, information describing an incentive associated with each item the user ordered/purchased, if any, etc. In this example, the set of inputs also may include a household size and a household income associated with the user, an age, a gender, or other demographic information associated with the user, etc. Continuing with this example, the set of inputs further may include information associated with a current session of the user with the online system 140, such as items included in a shopping list associated with the user, items for which the user searched, etc. In the above example, the set of inputs also may include information associated with a set of unused credits provided to the user by each program associated with the user, such as item identifiers for items that may be acquired using the set of unused credits, a number of unused credits included among the set of unused credits, a predicted expiration of the set of unused credits, etc.

Once the recommendation module 217 applies the item recommendation model, the recommendation module 217 may then receive an output from the model corresponding to a set of recommended items for a user. Continuing with the above example, the output received by the recommendation module 217 may correspond to a list of recommended items for the user, in which each item is identified based on one or more attributes (e.g., a serial number, a SKU, etc.) of the item. As described above, in some embodiments, each item identified by the item recommendation model is associated with an incentive determined by the model. In the above example, each recommended item may be associated with an incentive corresponding to a dollar amount (e.g., $2.00) or a percentage (e.g., 50%) off a price of the recommended item, a quantity or a bulk promotion (e.g., buy one, get one free) associated with the recommended item, etc. In some embodiments, the item recommendation model may be trained by the machine-learning training module 230, as further described below.

The interface module 211 also may generate or update a user interface (e.g., the ordering interface) that includes information describing a set of recommended items for a user and send it for display to a user client device 100 associated with the user. In embodiments in which each recommended item is associated with an incentive, information describing the incentive also may be included in the user interface. The user interface generated or updated by the interface module 211 or a portion of the user interface in which a set of recommended items for a user and an incentive associated with each recommended item is presented may be associated with a program, such as a loyalty or a rewards program, that offers rewards, coupons, discounts, promotions, or other incentives to attract and retain users. For example, the interface module 211 may generate a user interface that includes information describing a set of recommended items for a user based on a rewards/loyalty program of which the user is a member. In the above example, the set of recommended items for the user may be associated with item categories for which the user is likely to have an affinity that may be acquired using one or more sets of unused credits provided to the user by one or more programs associated with the user. In this example, each item may be described with various attributes of the item (e.g., its brand, size, price, etc.) and one or more images of the item. In the above example, the information describing each item also may be presented in association with information describing the set(s) of unused credits provided to the user by the program(s) associated with the user that may be used to acquire the item. Continuing with this example, the information describing each item further may be presented in association with information describing an incentive associated with the item (e.g., a coupon for a dollar amount off the price of the item, a quantity or a bulk promotion associated with the item, etc.). Furthermore, in this example, the information describing each item may be presented in association with an interactive element (e.g., an "Add" button) that allows the user to add the item to a shopping list associated with the user.

The order management module 220 manages orders for items from users. The order management module 220 receives orders from user client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences for how far to travel to deliver an order, the picker's ratings by users, or how often a picker agrees to service an order.

In some embodiments, the order management module 220 determines when to assign an order to a picker based on a delivery timeframe requested by the user who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online system 140. The online system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model is used by the machine-learning model to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

In embodiments in which the prediction module 215 accesses the credit expiration prediction model that is trained to predict an expiration of a set of unused credits provided to a user by a program associated with the user, the machine-learning training module 230 may train the credit expiration prediction model. The machine-learning training module 230 may train the credit expiration prediction model via supervised learning or using any other suitable technique or combination of techniques. Furthermore, the machine-learning training module 230 may train the credit expiration prediction model based on user data for users of the online system 140 associated with one or more programs that provided credits to the users, such as information describing the expiration of the unused credits provided to the users by the program(s). For example, the machine-learning training module 230 may train the credit expiration prediction model via supervised learning based on demographic and historical order or purchase information associated with users of the online system 140 associated with one or more programs that provided one or more sets of credits to each user, as well as a number of unused credits provided to each user by each program that expired.

To illustrate an example of how the credit expiration prediction model may be trained, suppose that the machine-learning training module 230 receives a set of training examples. In this example, the set of training examples may include attributes of each user associated with one or more programs, such as an age, a geographical region, a household income, etc. associated with each user. In the above example, the set of training examples also may include historical order or purchase information associated with each user, such as information describing items previously ordered/purchased by each user, a date of each previous order/purchase, credit cards, gift cards, or other payment instruments used for each previous order/purchase, a number of credits used for each previous order/purchase, if any, etc. Continuing with the above example, the set of training examples also may include information describing each program associated with each user (e.g., name, type of program, etc.) and information describing a set of credits provided to the user by each program (e.g., number of credits included in the set, items that may be acquired using the set of credits, an expiration of the set of credits, etc.). In the above example, the machine-learning training module 230 also may receive labels which represent expected outputs of the credit expiration prediction model, in which a label describes an expiration of a set of unused credits provided to a user by a program. In this example, a label may indicate whether some or all of a set of unused credits provided to a user by a program expired. In the above example, a label also or alternatively may indicate an amount (e.g., a number or a percentage) of a set of unused credits provided to a user by a program that expired. Continuing with this example, the machine-learning training module 230 may then train the credit expiration prediction model based on the attributes, as well as the labels by comparing its output from input data of each training example to the label for the training example.

In embodiments in which the recommendation module 217 accesses the item recommendation model that is trained to identify a set of recommended items for a user, the machine-learning training module 230 may train the item recommendation model. The machine-learning training module 230 may train the item recommendation model via unsupervised learning (e.g., using a clustering algorithm) or using any other suitable technique or combination of techniques. Furthermore, the machine-learning training module 230 may train the item recommendation model based on user data for users of the online system 140, such as user data for users associated with one or more programs that provided credits to the users. The user data may describe historical information (e.g., historical order, purchase, or interaction information) associated with the users. For example, the user data may describe items included in shopping lists or previous orders placed by the users or items the users browsed (e.g., item categories, incentives, brands, etc. associated with the items), dates of the users' previous orders or purchases, etc. The user data also may describe preferences associated with the users (e.g., for certain types of cuisines) or demographic or household information associated with the users (e.g., an age, a geographical region, a household income, etc. associated with each user). The user data further may describe one or more sets of credits provided to each user by one or more programs associated with the user (e.g., information identifying each program, information identifying items that may be acquired using each set of credits, a number of credits included among each set of credits, etc.), or any other suitable types of user data.

To illustrate an example of how the item recommendation model may be trained, suppose that the machine-learning training module 230 receives a set of training examples. In this example, the set of training examples may include attributes of each user associated with one or more programs, such as demographic information associated with the user, historical order, purchase, or interaction information associated with the user, information describing one or more sets of credits provided to the user by the program(s), etc. Continuing with this example, the machine-learning training module 230 may group the users into one or more clusters (e.g., via k-means or hierarchical clustering) based on the user data for the users, such that users included in the same cluster have at least a threshold measure of similarity to each other. In the above example, users included in the same cluster may have similar preferences and demographic information and may have previously ordered or purchased items associated with the same item categories or with the same incentives, etc. In the above example, based on user data for users in the same cluster, the machine-learning training module 230 may train the item recommendation model by identifying one or more items for which each user included in a corresponding cluster is likely to have an affinity (e.g., using an association rule algorithm). As described above, in some embodiments, the item recommendation model uses item embeddings describing items and user embeddings describing users to identify a set of recommended items for a user. In the above example, the machine-learning training module 230 may identify the item(s) for which each user included in a cluster is likely to have an affinity by generating a user embedding for each user and an item embedding for each item included among an inventory of each retailer associated with the online system 140 and clustering the user embeddings. In this example, the machine-learning training module 230 may then identify one or more item embeddings within a threshold distance of a corresponding cluster of user embeddings, in which the item embedding(s) is/are generated for the item(s).

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In situations in which the training example includes a label, the loss function is also based on the label for the training example. Some example loss functions include the mean square error function, the mean absolute error, the hinge loss function, and the cross-entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 also may store rules, policies, etc. for use by the online system 140. For example, the data store 240 may store a set of rules or policies that describe eligibility requirements associated with a program, a number of credits a user is eligible to receive from the program based on household size or income, etc. As an additional example, the data store 240 may store a set of rules describing different priorities associated with unused credits, gift cards, credit cards, etc. that may be used by the ranking module 213. The data store 240 uses computer-readable media to store data, and may use databases to organize the stored data.

Default Allocation of Credits to an Order Based on Predicted Credit Expirations

Figure 3:
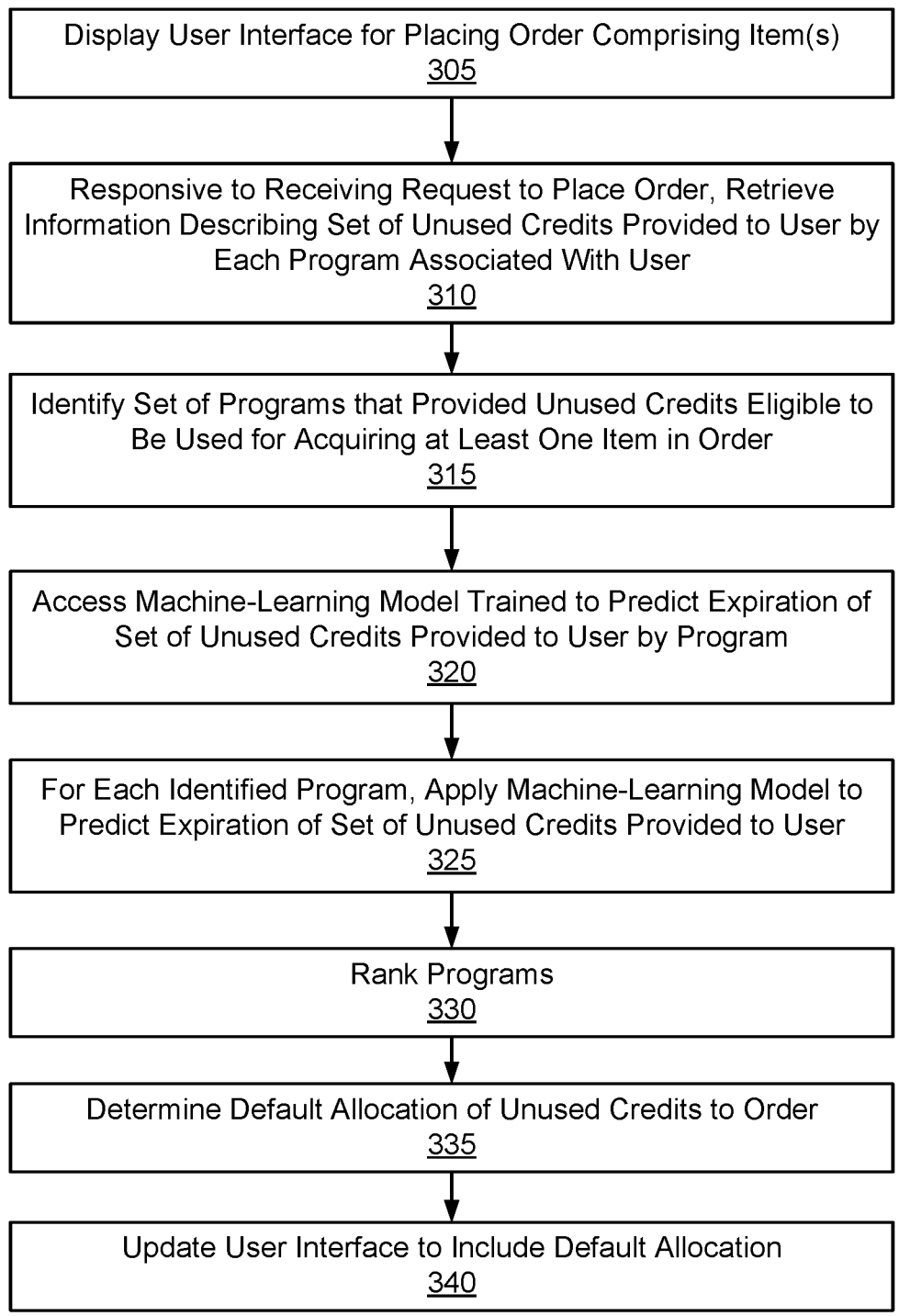
FIG. 3 is a flowchart of a method for determining a default allocation of credits to an order placed with an online system based on predicted expirations of the credits, in accordance with one or more embodiments.

FIG. 3 is a flowchart for a method for determining a default allocation of credits to an order placed with an online system 140 based on predicted expirations of the credits, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system. Additionally, each of these steps may be performed automatically by the online system 140 without human intervention.

The online system 140 displays 305 (e.g., using the interface module 211) an ordering interface for placing orders with the online system 140. Orders placed with the online system 140 may include items that users of the online system 140 add to their order via the ordering interface. For example, the online system 140 may generate (e.g., using the interface module 211) the ordering interface by populating it with items that users may select for adding to their order and send the ordering interface for display to user client devices 100 associated with the users.

Responsive to receiving a request from a user client device 100 associated with a user of the online system 140 to place an order including one or more items via the ordering interface, the online system 140 retrieves 310 (e.g., using the identification module 214) information (e.g., from the data store 240) describing a set of unused credits provided to the user by each of one or more programs associated with the user. The program(s) may include one or more directed spend programs or other types of programs that provide credits that may be used to acquire specific items included among inventories of retailers associated with the online system 140. As described above, a set of unused credits may expire after a threshold amount of time. For example, the online system 140 may retrieve 310 information describing the program(s) associated with the user and a set of unused credits provided to the user by each program. In this example, the retrieved information may include a name of each program and a type of each program (e.g., whether it is a government program, a private program, a program provided by the online system 140, a food assistance program, etc.). In the above example, the retrieved information also may include a number of unused credits included in each set of unused credits, information describing items (e.g., item identifiers, item categories, etc.) that may be acquired using each set of unused credits, and an expiration of each set of unused credits (e.g., an expiration date or an issue date and a number of days from issuance that the set of unused credits will expire).

The online system 140 also may retrieve (e.g., using the identification module 214) additional types of information associated with the user (e.g., from the data store 240). For example, the online system 140 may retrieve information describing queries received from the user client device 100 associated with the user and information describing items (e.g., item identifiers, brands, item categories, or other attributes of items) with which the user interacted during a current session of the user with the online system 140. In the above example, the items may include items added to a shopping list associated with the user, items the user browsed, items for which the user searched, items included in the order the user has requested to place with the online system 140, etc. As an additional example, the online system 140 may retrieve information describing previous orders the user placed with the online system 140, such as information describing items included in each order, whether any coupons or discounts were applied to items included in each order, a date that each order was placed, a number of credits provided by each program associated with the user used to acquire items included in each order, etc. In the above example, the online system 140 also may retrieve information describing a frequency with which the user orders an item or places orders using a credit card, a gift card, or credits received from each program associated with the user, etc. As yet another example, the online system 140 may retrieve demographic information associated with the user (e.g., age, gender, geographical region, etc.) and household information associated with the user (e.g., a number of people in the user's household, whether the user's household includes children or pets, the user's household income, etc.). In the above example, the online system 140 also may retrieve a set of preferences associated with the user (e.g., shopping preferences, dietary restrictions, favorite items, etc.) and stored payment instruments associated with the user (e.g., credit cards, gift cards, credits provided by the online system 140 or a retailer associated with the online system 140, etc.).

The online system 140 then identifies 315 (e.g., using the identification module 214) a set of programs associated with the user, in which a set of unused credits provided to the user by each identified program is eligible to be used for acquiring at least one item included in the order that the user has requested to place with the online system 140. The online system 140 may identify 315 the set of programs based on the information it retrieved 310. For example, suppose that the online system 140 has retrieved 310 information describing items that may be acquired using a set of unused credits provided to the user by each of the program(s) associated with the user and information describing the item(s) included in the order the user has requested to place with the online system 140 during the current session of the user with the online system 140. In this example, the online system 140 may identify 315 each set of unused credits that is eligible to be used for acquiring one or more items included in the order by comparing (e.g., using the identification module 214) one or more attributes of each item included in the order to one or more attributes of each item that may be acquired using the set of unused credits. In some embodiments, a set of unused credits provided to the user by each of multiple programs associated with the user is eligible to be used to acquire the same item included in the order that the user has requested to place with the online system 140. In such embodiments, a portion of a set of credits provided to the user by each program may be used to acquire the item. For example, suppose that the user is associated with a first program and a second program and that credits provided by either or both programs may be used to acquire an item included in the order that the user has requested to place with the online system 140. In this example, if the item has a price of $10.00, $10.00 in credit provided to the user by one of the programs or a portion of the credits (e.g., $5.00) provided to the user by each program may be used to acquire the item.

The online system 140 may then predict (e.g., using the prediction module 215) an expiration of a set of unused credits provided to the user by each program included among the identified set of programs associated with the user. A predicted expiration of a set of unused credits may correspond to a predicted likelihood that at least some of the set of unused credits will expire or an amount (e.g., a number or a percentage) of the set of unused credits that is predicted to expire. For example, if a set of unused credits includes $100.00 in credits, the online system 140 may predict a likelihood that at least a portion of the $100.00 in credits will expire before being used. Alternatively, in the above example, the online system 140 may predict that 30% or $30.00 of the $100.00 in credits will likely expire before being used. The online system 140 may predict an expiration of a set of unused credits provided to the user by each identified program associated with the user based on a set of user data for the user (e.g., information describing the set of unused credits or a frequency with which each payment instrument associated with the user is used), temporal information (e.g., the current date or time of the month), or any other suitable types of information. For example, suppose that user data for the user indicates that the user has $100.00 in unused credits provided by a program associated with the user that expire on Oct. 4, 2023 and that temporal information indicates that a current date is Oct. 3, 2023, such that the $100.00 in unused credits will expire tomorrow. In this example, based on the user data for the user and the temporal information, the online system 140 may predict a 99% likelihood that at least some of the set of unused credits provided to the user by the program will expire or that $100.00 of the set of unused credits will likely expire. Alternatively, in the above example, suppose that the user data for the user also indicates that the user usually places orders that cost an average of $100.00 once a week and that credits previously provided to the user by the program were used to cover about half the cost of the user's previous orders, while a payment instrument corresponding to a credit card associated with the user was used to cover the other half. In this example, the online system 140 may predict a 50% likelihood that at least some of the set of unused credits will expire or that $50.00 of the set of unused credits will likely expire.

The online system 140 also may predict an expiration of a set of unused credits provided to the user by each program included among the identified set of programs associated with the user using a credit expiration prediction model. The credit expiration prediction model is a machine-learning model trained to predict an expiration of a set of unused credits provided to the user by a program associated with the user. In some embodiments, the credit expiration prediction model is a multi-task model that predicts an expiration of a set of unused credits provided to the user by each program associated with the user. To use the credit expiration prediction model, the online system 140 may access 320 (e.g., using the prediction module 215) the model (e.g., from the data store 240) and for each program identified 315 by the online system 140, apply 325 (e.g., using the prediction module 215) the model to a set of inputs to predict an expiration of a set of unused credits provided to the user by a corresponding program. The set of inputs may include various types of information described above, such as a set of user data for the user, temporal information, etc. For example, the set of inputs may include information describing a set of unused credits provided to the user by a program associated with the user (e.g., a number of unused credits provided to the user by the program, an expiration of the set of unused credits, information describing items that may be acquired using the set of unused credits, etc.). In this example, the set of inputs also may include historical order or purchase information associated with the user (e.g., items ordered/purchased, frequency of orders placed with the online system 140, frequency of purchases made with retailers associated with the online system 140, total cost associated with previous orders/purchases, number of credits provided by the program used for previous orders/purchases, etc.). In the above example, the set of inputs also may include temporal information (e.g., information describing a current date, a number of days until the end of the current month, etc.).

Once the online system 140 applies 325 the credit expiration prediction model to the set of inputs, the online system 140 may receive (e.g., via the prediction module 215) an output from the model corresponding to a predicted expiration of a set of unused credits provided to the user by a program included among the identified set of programs associated with the user. Continuing with the above example, the output received by the online system 140 may correspond to a value, such as a percentage, a score, etc. that indicates or is proportional to a likelihood that some or all of the set of unused credits provided to the user by the program will expire. Alternatively, in the above example, the output may correspond to a value, such as a dollar amount, a percentage, etc. that indicates a predicted amount of the set of unused credits provided to the user by the program that will expire.

In some embodiments, as part of an allocation determination process, the online system 140 may predict multiple expirations of a set of unused credits provided to the user by each program included among the identified set of programs associated with the user. The online system 140 may do so by making the predictions in different ways (e.g., by making different types of predictions or by making the predictions based on different inputs). For example, the online system 140 may predict a first expiration of a set of unused credits provided to the user by a program, in which the first expiration corresponds to a likelihood that some or all of the set of unused credits will expire. In this example, the online system 140 also may predict a second expiration of the set of unused credits, in which the second expiration corresponds to a predicted amount (e.g., a number or a percentage) of the set of unused credits that will expire. As an additional example, using the credit expiration prediction model, the online system 140 may predict multiple expirations of a set of unused credits provided to the user by a program associated with the user. In this example, the online system 140 may use the model to predict a first expiration of the set of unused credits based on a set of inputs including information describing the set of unused credits (e.g., a number of unused credits included among the set, information describing items that may be acquired using the set of unused credits, etc.) and temporal information (e.g., the current date or time of the month). In this example, the online system 140 also may use the model to predict a second expiration of the set of unused credits based on a set of inputs that includes the information included in the input used to predict the first expiration of the set of unused credits, as well as historical order information associated with the user. In the above example, the online system 140 also may use the model to predict a third expiration of the set of unused credits based on a set of inputs that includes the information included in the input used to predict the second expiration of the set of unused credits, as well as demographic information associated with the user.

In some embodiments, the credit expiration prediction model may be trained by the online system 140 (e.g., using the machine-learning training module 230). The online system 140 may train the credit expiration prediction model via supervised learning or using any other suitable technique or combination of techniques. Furthermore, the online system 140 may train the credit expiration prediction model based on user data for users of the online system 140 associated with one or more programs that provided credits to the users, such as information describing the expiration of the unused credits provided to the users by the program(s). For example, the online system 140 may train the credit expiration prediction model via supervised learning based on demographic and historical order or purchase information associated with users of the online system 140 associated with one or more programs that provided one or more sets of credits to each user, as well as a number of unused credits provided to each user by each program that expired.

To illustrate an example of how the credit expiration prediction model may be trained, suppose that the online system 140 receives (e.g., via the machine-learning training module 230) a set of training examples. In this example, the set of training examples may include attributes of each user associated with one or more programs, such as an age, a geographical region, a household income, etc. associated with each user. In the above example, the set of training examples also may include historical order or purchase information associated with each user, such as information describing items previously ordered/purchased by each user, a date of each previous order/purchase, credit cards, gift cards, or other payment instruments used for each previous order/purchase, a number of credits used for each previous order/purchase, if any, etc. Continuing with the above example, the set of training examples also may include information describing each program associated with each user (e.g., name, type of program, etc.) and information describing a set of credits provided to the user by each program (e.g., number of credits included in the set, items that may be acquired using the set of credits, an expiration of the set of credits, etc.). In the above example, the online system 140 also may receive (e.g., via the machine-learning training module 230) labels which represent expected outputs of the credit expiration prediction model, in which a label describes an expiration of a set of unused credits provided to a user by a program. In this example, a label may indicate whether some or all of a set of unused credits provided to a user by a program expired. In the above example, a label also or alternatively may indicate an amount (e.g., a number or a percentage) of a set of unused credits provided to a user by a program that expired. Continuing with this example, the online system 140 may then train the credit expiration prediction model based on the attributes, as well as the labels by comparing its output from input data of each training example to the label for the training example.

Once the online system 140 predicts an expiration of a set of unused credits provided to the user by each program included among the identified set of programs associated with the user, the online system 140 may rank 330 (e.g., using the ranking module 213) the identified set of programs associated with the user. The online system 140 may do so based on a predicted expiration of a set of unused credits provided to the user by each program. For example, suppose that the user is associated with three programs identified 315 by the online system 140, in which a set of unused credits provided to the user by a first program is predicted to expire first, a set of unused credits provided to the user by a second program is predicted to expire next, and a set of unused credits provided to the user by a third program is predicted to expire last. In this example, the online system 140 may rank 330 the programs from highest to lowest based on the predicted expiration of the corresponding sets of credits, such that the first program is ranked 330 first, the second program is ranked 330 second, and the third program is ranked 330 third. Alternatively, in the above example, suppose that $100.00 of unused credits provided to the user by the first program are predicted to expire, $50.00 of unused credits provided to the user by the second program are predicted to expire, and $10.00 of unused credits provided to the user by the third program are predicted to expire. In this example, the online system 140 may rank 330 the programs from highest to lowest based on the corresponding amounts of unused credits predicted to expire, such that the first program is ranked 330 first, the second program is ranked 330 second, and the third program is ranked 330 third. As described above, in some embodiments, the online system 140 predicts multiple expirations of a set of unused credits provided to the user by each identified program associated with the user as part of an allocation determination process. In such embodiments, as part of the allocation determination process, the online system 140 ranks 330 the identified set of programs associated with the user multiple times based on the predicted expirations associated with the set of programs, such that each ranking of the programs is based on expirations that are predicted the same way.

In embodiments in which the user is also associated with one or more credit cards, gift cards, or any other types of payment instruments, the online system 140 may rank 330 the identified set of programs and payment instrument(s) together in a unified ranking. The online system 140 may do so based on a predicted expiration of a set of unused credits provided to the user by each program, information associated with each payment instrument (e.g., an expiration associated with the payment instrument, items to which the payment instrument may be applied, etc.), a set of rules, or any other suitable types of information. For example, suppose that the identified set of programs includes a program that provided a set of unused credits to the user and that the user is also associated with payment instruments including a gift card and a credit card. In this example, based on a set of rules (e.g., stored in the data store 240) describing different priorities associated with unused credits, gift cards, and credit cards, the online system 140 may rank 330 the program first, the gift card second, and the credit card last.

For each set of unused credits provided to the user by the identified set of programs associated with the user, the online system 140 may determine 335 (e.g., using the allocation module 216) a default allocation of a subset of a corresponding set of unused credits to the order that the user has requested to place with the online system 140. The online system 140 may do so based on the ranking of the identified set of programs. For example, suppose that the identified set of programs includes two programs, in which a first program provided $100.00 of unused credits to the user and the second program provided $10.00 of unused credits to the user and all of the credits expire tomorrow, and that a payment instrument corresponding to a credit card is also associated with the user. In this example, suppose also that the online system 140 has ranked 330 the first program, the second program, and the credit card first, second, and third, respectively. Continuing with this example, suppose also that the order the user has requested to place with the online system 140 includes four items and that unused credits provided by both programs are eligible to be used to acquire the first item, unused credits provided by the second program are eligible to be used to acquire the second item, unused credits are not eligible to be used to acquire the third item, and unused credits provided by both programs are eligible to be used to acquire the fourth item. In this example, based on the ranking, the online system 140 may allocate as many of the unused credits provided by the first program as possible, such that $12.00 of the unused credits are allocated to the first and fourth items, which cost $8.00 and $4.00, respectively. In this example, if the second item costs $14.00, since the $10.00 of unused credits provided by the second program will not cover the price of this item, the online system 140 may allocate all $10.00 of unused credits to the second item. In the above example, the online system 140 may allocate $7.00 to a credit card for the rest of the order ($4.00 to cover the remaining cost of the second item and $3.00 to cover the entire cost of the third item).

The default allocation of unused credits to the order determined 335 by the online system 140 may be aggregated or itemized. In embodiments in which the default allocation of unused credits to the order determined 335 by the online system 140 is aggregated, the default allocation describes an amount (e.g., a dollar amount) associated with each program, credit card, gift card, or other payment instrument to be applied to the order. In the above example, if the total cost of the order is $29.00, the default allocation may be aggregated to indicate that $12.00 of the unused credits provided to the user by the first program, $10.00 of the unused credits provided to the user by the second program, and $7.00 in charges on the credit card associated with the user are to be used for the order. In embodiments in which the default allocation of unused credits to the order determined 335 by the online system 140 is itemized, the default allocation may describe an amount (e.g., a dollar amount) associated with each program, credit card, gift card, or other payment instrument to be applied to each item in the order. In the above example, the default allocation also may be itemized to indicate that the $12.00 of unused credits provided by the first program is being used to acquire the first and fourth items that cost $8.00 and $4.00, respectively, that the $10.00 of unused credits provided by the second program and $4.00 in credit card charges are being used to acquire the second item that costs $14.00, and that $3.00 in credit card charges is being used to acquire the third item that costs $3.00.

In embodiments in which the online system 140 ranks 330 the identified set of programs associated with the user multiple times as part of the allocation determination process described above, the online system 140 may determine (step 335) multiple default allocations of unused credits to the order as part of the allocation determination process. The online system 140 may do so based on each ranking of the identified set of programs. The allocation determination process may be repeated until the online system 140 determines (e.g., using the allocation module 216) that a set of stopping criteria have been met. The set of stopping criteria may indicate that a default allocation of unused credits to the order is optimal (e.g., the usage of unused credits provided to the user by the identified set of programs associated with the user is maximized). For example, the allocation determination process (which includes predicting an expiration of a set of unused credits provided to the user by each identified program, ranking 330 the identified set of programs, and determining 335 the default allocation of unused credits to the order), may be repeated until the online system 140 determines that multiple default allocations of unused credits to the order have converged. The allocation determination process also may be repeated a specific number of times and the online system 140 may identify (e.g., using the allocation module 216) an optimal default allocation of unused credits to the order. For example, the allocation determination process may be repeated n number of times to generate multiple default allocations of unused credits to the order. In this example, the online system 140 may then identify, from the multiple default allocations, a default allocation that minimizes a predicted number of unused credits provided to the user that will expire or a likelihood that at least some of the unused credits will expire.

Figure 4A:
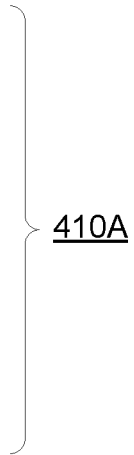

Once the online system 140 determines 335, for each set of unused credits provided to the user by the identified set of programs associated with the user, the default allocation of a subset of a corresponding set of unused credits to the order, the online system 140 may update 340 (e.g., using the interface module 211) the ordering interface to include information describing the default allocation. In embodiments in which the allocation determination process is executed, the online system 140 may update 340 the ordering interface to include information describing an optimal default allocation identified by the online system 140. As described above, the default allocation may be aggregated. FIGS. 4A and 4B illustrate examples of a user interface including a default allocation of credits to an order placed with an online system 140 based on predicted expirations of the credits, in accordance with one or more embodiments. Referring first to FIG. 4A, if the total cost of the order 405 is $29.00, the default allocation 410A may indicate that $12.00 of unused credits 415A provided to the user by Program 1, $10.00 of unused credits 415B provided to the user by Program 2, and $7.00 in charges 420 on a credit card associated with the user are to be used for the order 405. As also described above, the default allocation 410 also may be itemized. As shown in FIG. 4B, in the above example, the default allocation 410B also may indicate that the $12.00 of unused credits 415A provided by Program 1 is being used to acquire Item 1, which costs $8.00, and Item 4, which costs $4.00, that the $10.00 of unused credits 415B provided by Program 2 and $4.00 of the $7.00 in credit card charges 420 are being used to acquire Item 2, which costs $14.00, and that $3.00 of the $7.00 in credit card charges 420 is being used to acquire Item 3, which costs $3.00. The default allocation 410 of unused credits 415 to the order 405 may be manually changed by the user to whom the default allocation 410 is presented. In the above examples, the user may change the default allocation 410 by editing a dollar amount of unused credits 415 provided by Program 1 or Program 2 or a dollar amount in credit card charges 420 (e.g., for each item or in aggregate).

The online system 140 also may identify (e.g., using the recommendation module 217) a set of recommended items for the user. The online system 140 may do so based on user data for the user that the online system 140 retrieves (e.g., using the recommendation module 217 from the data store 240). Examples of such types of information include: demographic information associated with the user, the user's preferences, household information associated with the user, historical order, purchase, or interaction information associated with the user, information describing actions the user performed during the current session of the user with the online system 140, etc. For example, based on historical order or purchase information associated with the user, the online system 140 may identify the set of recommended items for the user that include items the user ordered/purchased with at least a threshold frequency. In the above example, based on historical interaction information associated with the user, the set of recommended items also may include items associated with item categories that the user frequently browsed or items that the user frequently added to their cart that were also on sale or for which a coupon was available. Continuing with the above example, based on a set of preferences associated with the user or household information associated with the user, the set of recommended items also may include items for which the user is likely to have an affinity. In this example, if the set of preferences associated with the user indicate that the user has a preference for spicy foods, the set of recommended items may include hot sauce, spicy salsa, etc. Additionally, in the above example, if the household information associated with the user indicates that the user's household includes a baby and small children, the set of recommended items also may include baby food, diapers, school supplies, etc. Continuing with this example, suppose that items included in a shopping list associated with the user or items for which the user searched during a current session of the user with the online system 140 include spaghetti sauce. In this example, the set of recommended items also may include items for which the user is likely to have an affinity based on the spaghetti sauce, such as spaghetti, garlic bread, or other items that are often ordered with spaghetti sauce.

The online system 140 also may identify the set of recommended items for the user based on additional types of information, such as a predicted expiration of a set of unused credits 415 provided to the user by each of the identified set of programs associated with the user, or any other suitable types of information. For example, based on user data for the user and a predicted expiration of a set of unused credits 415 provided to the user by each of the identified set of programs associated with the user, the online system 140 may identify the set of recommended items for the user that includes items associated with item categories for which the user is likely to have an affinity that may be acquired using the set of unused credits 415 provided to the user by each program. In the above example, when identifying the set of recommended items, the online system 140 may prioritize items based on the predicted expiration of the set of unused credits 415 provided to the user by each program, such that the online system 140 may favor identifying items that may be acquired using one or more sets of unused credits 415 associated with at least a threshold predicted expiration. Alternatively, in the above example, the online system 140 may prioritize items that may be acquired using sets of unused credits 415 associated with higher predicted likelihoods of expiring one or more unused credits 415 predicted to expire over items that may be acquired using sets of unused credits 415 associated with lower predicted likelihoods of expiring one or more unused credits 415 predicted to expire.

In some embodiments, in addition to identifying the set of recommended items for the user, the online system 140 also determines (e.g., using the recommendation module 217) an incentive (e.g., a coupon, a reward, a discount, a promotion, etc.) associated with each recommended item. An incentive associated with a recommended item may correspond to a dollar amount (e.g., $3.00) or a percentage (e.g., 25%) off a price of the recommended item, a quantity or bulk promotion (e.g., buy two, get one free) associated with the recommended item, a number of points associated with the recommended item that may be redeemed for discounts or other rewards, etc. The online system 140 may determine an incentive associated with a recommended item based on historical user information associated with the user or based on any other suitable types of information. For example, suppose that the online system 140 retrieves historical order or purchase information associated with the user (e.g., from the data store 240), in which the historical order/purchase information describes whether each item previously ordered/purchased by the user was associated with an incentive and if so, information describing the incentive (e.g., a dollar amount or a percentage off). In this example, suppose also that the set of recommended items for the user includes a specific brand of frozen pizza that normally costs $7.00 and the historical order information indicates that the user previously ordered/purchased the item only when an incentive was available for the item that reduced the price of the item to between $3.00 and $4.00. In the above example, the online system 140 may determine an incentive associated with the recommended item that reduces the price of the item by a similar amount (e.g., a 50% off coupon, a buy one, get one free promotion, etc.).

The online system 140 also may identify the set of recommended items for the user using an item recommendation model. The item recommendation model may be an ensemble machine-learning model or any other suitable type of machine-learning model trained to identify a set of recommended items for the user. For example, the item recommendation model may be an ensemble machine-learning model that combines the output of the credit expiration prediction model describing a predicted expiration of a set of unused credits 415 provided to the user by each of the identified set of programs associated with the user with the output of another model that is applied to a set of inputs to identify the set of recommended items for the user. In some embodiments, in addition to identifying the set of recommended items for the user, the item recommendation model also determines an incentive associated with each recommended item, such that each item identified by the item recommendation model is associated with an incentive. In some embodiments, the item recommendation model uses item embeddings describing items and user embeddings describing users to identify the set of recommended items for the user. These item embeddings and user embeddings may be generated by separate machine-learning models and may be stored (e.g., in the data store 240).

To use the item recommendation model, the online system 140 may access (e.g., using the recommendation module 217) the model (e.g., from the data store 240) and apply (e.g., using the recommendation module 217) the model to a set of inputs. The set of inputs may include various types of information described above, such as a set of user data for the user, information associated with a set of unused credits 415 provided to the user by each program associated with the user, or any other suitable types of information. For example, the set of inputs may include historical order or purchase information associated with the user including information describing items the user previously ordered or purchased, a frequency with which the user ordered/purchased each item, information describing an incentive associated with each item the user ordered/purchased, if any, etc. In this example, the set of inputs also may include a household size and a household income associated with the user, an age, a gender, or other demographic information associated with the user, etc. Continuing with this example, the set of inputs further may include information associated with the current session of the user with the online system 140, such as items included in a shopping list associated with the user, items for which the user searched, etc. In the above example, the set of inputs also may include information associated with a set of unused credits 415 provided to the user by each program associated with the user, such as item identifiers for items that may be acquired using the set of unused credits 415, a number of unused credits 415 included among the set of unused credits 415, a predicted expiration of the set of unused credits 415, etc.

Once the online system 140 applies the item recommendation model, the online system 140 may then receive (e.g., via the recommendation module 217) an output from the model corresponding to the set of recommended items for the user. Continuing with the above example, the output received by the online system 140 may correspond to a list of recommended items for the user, in which each item is identified based on one or more attributes (e.g., a serial number, a SKU, etc.) of the item. As described above, in some embodiments, each item identified by the item recommendation model is associated with an incentive determined by the model. In the above example, each recommended item may be associated with an incentive corresponding to a dollar amount (e.g., $2.00) or a percentage (e.g., 50%) off a price of the recommended item, a quantity or a bulk promotion (e.g., buy one, get one free) associated with the recommended item, etc.

In some embodiments, the item recommendation model may be trained by the online system 140 (e.g., using the machine-learning training module 230). The online system 140 may train the item recommendation model via unsupervised learning (e.g., using a clustering algorithm) or using any other suitable technique or combination of techniques. Furthermore, the online system 140 may train the item recommendation model based on user data for users of the online system 140, such as user data for users associated with one or more programs that provided credits 415 to the users. The user data may describe historical information (e.g., historical order, purchase, or interaction information) associated with the users. For example, the user data may describe items included in shopping lists or previous orders 405 placed by the users or items the users browsed (e.g., item categories, incentives, brands, etc. associated with the items), dates of the users' previous orders 405 or purchases, etc. The user data also may describe preferences associated with the users (e.g., for certain types of cuisines) or demographic or household information associated with the users (e.g., an age, a geographical region, a household income, etc. associated with each user). The user data further may describe one or more sets of credits 415 provided to each user by one or more programs associated with the user (e.g., information identifying each program, information identifying items that may be acquired using each set of credits 415, a number of credits 415 included among each set of credits 415, etc.), or any other suitable types of user data.

To illustrate an example of how the item recommendation model may be trained, suppose that the online system 140 receives (e.g., via the machine-learning training module 230) a set of training examples. In this example, the set of training examples may include attributes of each user associated with one or more programs, such as demographic information associated with the user, historical order, purchase, or interaction information associated with the user, information describing one or more sets of credits 415 provided to the user by the program(s), etc. Continuing with this example, the online system 140 may group (e.g., using the machine-learning training module 230) the users into one or more clusters (e.g., via k-means or hierarchical clustering) based on the user data for the users, such that users included in the same cluster have at least a threshold measure of similarity to each other. In the above example, users included in the same cluster may have similar preferences and demographic information and may have previously ordered or purchased items associated with the same item categories or with the same incentives, etc. In the above example, based on user data for users in the same cluster, the online system 140 may train the item recommendation model by identifying (e.g., using the machine-learning training module 230) one or more items for which each user included in a corresponding cluster is likely to have an affinity (e.g., using an association rule algorithm). As described above, in some embodiments, the item recommendation model uses item embeddings describing items and user embeddings describing users to identify a set of recommended items for a user. In the above example, the online system 140 may identify the item(s) for which each user included in a cluster is likely to have an affinity by generating (e.g., using the machine-learning training module 230) a user embedding for each user and an item embedding for each item included among an inventory of each retailer associated with the online system 140 and clustering (e.g., using the machine-learning training module 230) the user embeddings. In this example, the online system 140 may then identify (e.g., using the machine-learning training module 230) one or more item embeddings within a threshold distance of a corresponding cluster of user embeddings, in which the item embedding(s) is/are generated for the item(s).

The online system 140 also may generate (e.g., using the interface module 211) or update (e.g., using the interface module 211) a user interface (e.g., the ordering interface) that includes information describing the set of recommended items for the user and send (e.g., using the interface module 211) the user interface for display to the user client device 100 associated with the user. In embodiments in which each recommended item is associated with an incentive, information describing the incentive also may be included in the user interface. The user interface generated or updated by the online system 140 or a portion of the user interface in which the set of recommended items for the user and an incentive associated with each recommended item is presented may be associated with a program, such as a loyalty or a rewards program, that offers rewards, coupons, discounts, promotions, or other incentives to attract and retain users.

Figure 5:
FIG. 5 is an example of a user interface including a set of recommended items for a user of an online system based on predicted expirations of credits provided to the user, in accordance with one or more embodiments.

FIG. 5 is an example of a user interface including a set of recommended items for a user of an online system 140 based on predicted expirations of credits 415 provided to the user, in accordance with one or more embodiments. As shown in FIG. 5, the online system 140 may generate a user interface that includes information describing a set of recommended items 505 for the user based on a rewards/loyalty program of which the user is a member. In the above example, the set of recommended items 505 for the user may be associated with item categories (e.g., cookies, ice cream, ground beef, etc.) for which the user is likely to have an affinity that may be acquired using one or more sets of unused credits 415 provided to the user by one or more programs associated with the user. In this example, each item 505 may be described with various attributes of the item 505 (e.g., its brand, size, price, etc.) and one or more images of the item 505. In the above example, the information describing each item 505 also may be presented in association with information describing the set(s) of unused credits 415 provided to the user by the program(s) associated with the user that may be used to acquire the item 505 (e.g., whether credits 415 provided to the user by Program 1 and/or Program 2 are eligible to be used to acquire each item 505). Continuing with this example, the information describing each item 505 further may be presented in association with information describing an incentive associated with the item 505 (e.g., a coupon for a dollar amount off the price of the item 505, a quantity or a bulk promotion associated with the item 505, etc.). Furthermore, in this example, the information describing each item 505 may be presented in association with an interactive element (e.g., an "Add" button) that allows the user to add the item 505 to a shopping list associated with the user.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
   sending, from an online system to a device associated with a user of the online system, instructions causing the device to display a user interface for placing an order comprising one or more items;
   receiving, from the device, a request to place the order via the user interface;
   responsive to receiving the request to place the order via the user interface, retrieving information describing a set of unused credits provided to the user by each program of one or more programs associated with the user, wherein the set of unused credits expires after a threshold amount of time;

identifying a set of programs of the one or more programs, wherein the set of unused credits provided by each program of the set of programs is eligible to be used for acquiring at least one item of the one or more items;

accessing a machine-learning model trained to predict an expiration of the set of unused credits provided to the user by a program, wherein the machine-learning model is trained by:

receiving a set of training examples, the set of training examples including attributes of each user of a plurality of users associated with one or more programs of the set of programs, information describing each program of the set of programs associated with each user, and information describing a set of credits provided to each user by each program of the set of programs, receiving a plurality of labels, each of the plurality of labels including information describing an expiration of the set of credits provided to each user by each program of the set of programs, applying the machine-learning model to the set of training examples to generate a plurality of outputs, each of the plurality of outputs including a prediction about the expiration of the set of credits provided to each user by each program of the set of programs, comparing each of the plurality of outputs to a respective label of the plurality of labels, and updating a set of parameters of the machine-learning model based on a result of the comparing each of the plurality of outputs to the respective label;

for each program of the set of programs, applying the machine-learning model to the information describing the set of unused credits provided to the user by each program of the set of programs and a current time to predict the expiration of the set of unused credits provided to the user by each program of the set of programs;

ranking the set of programs based at least in part on the predicted expiration of the set of unused credits provided to the user by each program of the set of programs;

for each set of unused credits provided to the user by the set of programs, generating a default allocation of a subset of a corresponding set of unused credits to the order based at least in part on the ranking; and updating the user interface to include the default allocation of the subset of each set of unused credits to the order, wherein the updating causes the device to display the updated user interface with mapping of each item in the order to an editable allocation from the default allocation of at least one corresponding credit from the subset of unused credits.

2. The method of claim 1, wherein the expiration is predicted by predicting a likelihood that a subset of the set of unused credits provided to the user by each program of the set of programs will expire.

3. The method of claim 1, wherein the expiration is predicted by predicting an amount of the set of unused credits provided to the user by each program of the set of programs that will expire.

4. The method of claim 1, further comprising:

executing an allocation determination process, the allocation determination process comprising:

for each program of the set of programs, applying the machine-learning model to the information describing the set of unused credits provided to the user each program of the set of programs and the current time to predict an additional expiration of the set of unused credits provided to the user by each program of the set of programs, and for each set of unused credits provided to the user by the set of programs, determining an additional default allocation of the subset of a corresponding set of unused credits to the order based at least in part on an additional ranking of the set of programs, the additional ranking based at least in part on the predicted additional expiration of the set of unused credits provided to the user by each program of the set of programs;

repeating the allocation determination process until convergence of the default allocation of the subset of each set of unused credits to the order and one or more additional default allocations of the subset of each set of unused credits to the order; and updating the user interface to include a convergence of the default allocation of the subset of each set of unused credits to the order and the one or more additional default allocations of the subset of each set of unused credits to the order.

5. The method of claim 1, further comprising:

accessing an ensemble machine-learning model trained to identify a set of recommended items for the user, wherein the ensemble machine-learning model is trained by:

receiving user data for the plurality of users, wherein the user data further comprises historical order information for the plurality of users, and training the ensemble machine-learning model based at least in part on the user data for the plurality of users;

applying the ensemble machine-learning model to a set of user data for the user and the predicted expiration of the set of unused credits provided to the user by each program of the set of programs to identify the set of recommended items for the user; and sending, to the device, information describing the set of recommended items for the user, wherein each recommended item of the set of recommended items is associated with one or more of: a coupon and a discount.

6. The method of claim 5, wherein applying the ensemble machine-learning model comprises applying the ensemble machine-learning model further to information describing the one or more items included in the order to identify the set of recommended items for the user.

7. The method of claim 5, wherein applying the ensemble machine-learning model comprises applying the ensemble machine-learning model further to information about whether the set of unused credits provided to the user by each program of the one or more programs is eligible to be used for acquiring the set of recommended items.

8. The method of claim 5, wherein applying the ensemble machine-learning model comprises applying a clustering algorithm to identify the set of recommended items for the user.

9. The method of claim 8, wherein training the ensemble machine-learning model comprises:

grouping, based at least in part on the user data associated with the plurality of users, the plurality of users into one or more clusters; and identifying, based at least in part on the historical order information, one or more items for which each user included in a corresponding cluster is likely to have an affinity.

10. The method of claim 1, wherein a plurality of unused credits provided to the user by a plurality of programs is eligible to be used for acquiring at least one item of the one or more items.

11. A computer program product comprising a non-transitory computer-readable storage medium having instructions encoded thereon that, when executed by a processor, cause the processor to perform steps comprising:
sending, from an online system to a device associated with a user of the online system, instructions causing the device to display a user interface for placing an order comprising one or more items;
receiving, from the device, a request to place the order via the user interface;
responsive to receiving the request to place the order via the user interface, retrieving information describing a set of unused credits provided to the user by each program of one or more programs associated with the user, wherein the set of unused credits expires after a threshold amount of time;
identifying a set of programs of the one or more programs, wherein the set of unused credits provided by each program of the set of programs is eligible to be used for acquiring at least one item of the one or more items;
accessing a machine-learning model trained to predict an expiration of the set of unused credits provided to the user by a program, wherein the machine-learning model is trained by:
receiving a set of training examples, the set of training examples including attributes of each user of a plurality of users associated with one or more programs of the set of programs, information describing each program of the set of programs associated with each user, and information describing a set of credits provided to each user by each program of the set of programs,
receiving a plurality of labels, each of the plurality of labels including information describing an expiration of the set of credits provided to each user by each program of the set of programs,
applying the machine-learning model to the set of training examples to generate a plurality of outputs, each of the plurality of outputs including a prediction about the expiration of the set of credits provided to each user by each program of the set of programs,
comparing each of the plurality of outputs to a respective label of the plurality of labels, and
updating a set of parameters of the machine-learning model based on a result of the comparing each of the plurality of outputs to the respective label;
for each program of the set of programs, applying the machine-learning model to the information describing the set of unused credits provided to the user by each program of the set of programs and a current time to predict the expiration of the set of unused credits provided to the user by each program of the set of programs;
ranking the set of programs based at least in part on the predicted expiration of the set of unused credits provided to the user by each program of the set of programs;
for each set of unused credits provided to the user by the set of programs, generating a default allocation of a subset of a corresponding set of unused credits to the order based at least in part on the ranking; and
updating the user interface to include the default allocation of the subset of each set of unused credits to the order, wherein the updating causes the device to display the updated user interface with mapping of each item in the order to an editable allocation from the default allocation of at least one corresponding credit from the subset of unused credits.

12. The computer program product of claim 11, wherein the expiration is predicted by predicting a likelihood that a subset of the set of unused credits provided to the user by each program of the set of programs will expire.

13. The computer program product of claim 11, wherein the expiration is predicted by predicting an amount of the set of unused credits provided to the user by each program of the set of programs that will expire.

14. The computer program product of claim 11, wherein the computer-readable storage medium further has instructions encoded thereon that, when executed by the processor, cause the processor to perform steps comprising:
executing an allocation determination process, the allocation determination process comprising:
for each program of the set of programs, applying the machine-learning model to the information describing the set of unused credits provided to the user each program of the set of programs and the current time to predict an additional expiration of the set of unused credits provided to the user by each program of the set of programs, and
for each set of unused credits provided to the user by the set of programs, determining an additional default allocation of the subset of a corresponding set of unused credits to the order based at least in part on an additional ranking of the set of programs, the additional ranking based at least in part on the predicted additional expiration of the set of unused credits provided to the user by each program of the set of programs;
repeating the allocation determination process until convergence of the default allocation of the subset of each set of unused credits to the order and one or more additional default allocations of the subset of each set of unused credits to the order; and
updating the user interface to include a convergence of the default allocation of the subset of each set of unused credits to the order and the one or more additional default allocations of the subset of each set of unused credits to the order.

15. The computer program product of claim 11, wherein the computer-readable storage medium further has instructions encoded thereon that, when executed by the processor, cause the processor to perform steps comprising:
accessing an ensemble machine-learning model trained to identify a set of recommended items for the user, wherein the ensemble machine-learning model is trained by:
receiving user data for the plurality of users, wherein the user data further comprises historical order information for the plurality of users, and
training the ensemble machine-learning model based at least in part on the user data for the plurality of users;
applying the ensemble machine-learning model to a set of user data for the user and the predicted expiration of the set of unused credits provided to the user by each program of the set of programs to identify the set of recommended items for the user; and
sending, to the device, information describing the set of recommended items for the user, wherein each recommended item of the set of recommended items is associated with one or more of: a coupon and a discount.

16. The computer program product of claim 15, wherein applying the ensemble machine-learning model comprises applying the ensemble machine-learning model further to information describing the one or more items included in the order to identify the set of recommended items for the user.

17. The computer program product of claim 15, wherein applying the ensemble machine-learning model comprises applying the ensemble machine-learning model further to information about whether the set of unused credits provided to the user by each program of the one or more programs is eligible to be used for acquiring the set of recommended items.

18. The computer program product of claim 15, wherein applying the ensemble machine-learning model comprises applying a clustering algorithm to identify the set of recommended items for the user.

19. The computer program product of claim 18, wherein training the ensemble machine-learning model comprises:
grouping, based at least in part on the user data associated with the plurality of users, the plurality of users into one or more clusters; and
identifying, based at least in part on the historical order information, one or more items for which each user included in a corresponding cluster is likely to have an affinity.

20. A computer system comprising:
a processor; and
non-transitory computer-readable storage medium storing instructions that, when executed by the processor, perform actions comprising:
sending, from an online system to a device associated with a user of the online system, instructions causing the device to display a user interface for placing an order comprising one or more items;
receiving, from the device, a request to place the order via the user interface;
responsive to receiving the request to place the order via the user interface, retrieving information describing a set of unused credits provided to the user by each program of one or more programs associated with the user, wherein the set of unused credits expires after a threshold amount of time;
identifying a set of programs of the one or more programs, wherein the set of unused credits provided by each program of the set of programs is eligible to be used for acquiring at least one item of the one or more items;
accessing a machine-learning model trained to predict an expiration of the set of unused credits provided to the user by a program, wherein the machine-learning model is trained by:
receiving a set of training examples, the set of training examples including attributes of each user of a plurality of users associated with one or more programs of the set of programs, information describing each program of the set of programs associated with each user, and information describing a set of credits provided to each user by each program of the set of programs,
receiving a plurality of labels, each of the plurality of labels including information describing an expiration of the set of credits provided to each user by each program of the set of programs,
applying the machine-learning model to the set of training examples to generate a plurality of outputs, each of the plurality of outputs including a prediction about the expiration of the set of credits provided to each user by each program of the set of programs,
comparing each of the plurality of outputs to a respective label of the plurality of labels, and
updating a set of parameters of the machine-learning model based on a result of the comparing each of the plurality of outputs to the respective label;
for each program of the set of programs, applying the machine-learning model to the information describing the set of unused credits provided to the user by each program of the set of programs and a current time to predict the expiration of the set of unused credits provided to the user by each program of the set of programs;
ranking the set of programs based at least in part on the predicted expiration of the set of unused credits provided to the user by each program of the set of programs;
for each set of unused credits provided to the user by the set of programs, generating a default allocation of a subset of a corresponding set of unused credits to the order based at least in part on the ranking; and
updating the user interface to include the default allocation of the subset of each set of unused credits to the order, wherein the updating causes the device to display the updated user interface with mapping of each item in the order to an editable allocation from the default allocation of at least one corresponding credit from the subset of unused credits.

* * * * *